United States Patent

Nagasawa

[15] 3,675,088

[45] July 4, 1972

[54] NEGATIVE RESISTANCE DEVICE

[72] Inventor: Masahiro Nagasawa, Hirakata, Japan

[73] Assignee: Matsushita Electric Industrial Co., Ltd., Osaka, Japan

[22] Filed: July 28, 1970

[21] Appl. No.: 58,782

[30] Foreign Application Priority Data

Dec. 7, 1969 Japan..................................44/02158

[52] U.S. Cl. ....................317/234 R, 317/234 V, 317/235 K, 317/235 P, 106/47 R, 252/63.5 S

[51] Int. Cl. ..........................................................H01l 3/02

[58] Field of Search .......................317/234, 235; 252/62.5 S; 106/47

[56] References Cited

UNITED STATES PATENTS 3,370,208 2/1968 Mizushima.............................317/234

OTHER PUBLICATIONS

" Inorganic Glass–Forming Systems," Rawson (1967) Academic Press, pg. 185- 191

"Equilibrium in Glass–Forming System $TeO_2$–$V_2O_5$"—Chase Jour. of Am. Ceramic Soc. Sept. 1964, pg. 467

*Primary Examiner*—John W. Huckert

*Assistant Examiner*—E. Wojciechowicz

*Attorney*—Wenderoth, Lind & Ponack

[57] ABSTRACT

A non-rectifying monostable negative resistance device. The device has a glass layer 0.002 to 0.2 mm thick with a composition consisting essentially of, by analysis, tellurium, iron, and oxygen. Two electrodes are applied to opposite surfaces of said glass layer. The atomic ratio of tellurium to iron ranges from 85:15 to 64:36. Such a device has a monostable current-voltage characteristic which includes negative resistance regions and which is very stable.

6 Claims, 2 Drawing Figures

Figure 1:
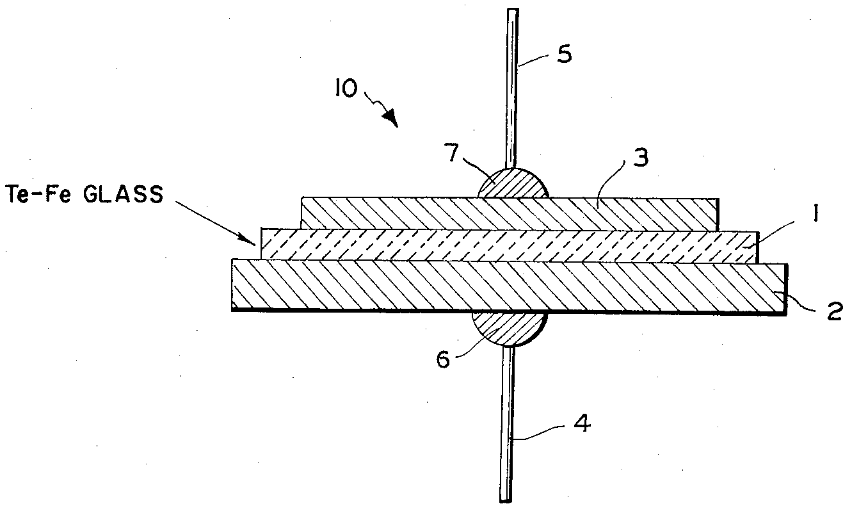

INVENTOR
MASAHIRO NAGASAWA

BY Wenderoth, Lind & Ponack
ATTORNEYS

NEGATIVE RESISTANCE DEVICE

This invention relates to electrical devices comprising glassy materials, and in particular, to current controlled negative resistance devices comprising oxide glasses.

It is known in the art that certain solid state semiconductive materials in glassy state have a remarkable physical property which is characterized by the presence of two (or more) physical states; a semiconductive state characterized by relatively high electrical resistance, and a metallic state characterized by relatively low electrical resistance. The electrical characteristic of this sort of semiconductive glass is expressed by two discrete curves on a current-voltage plot, which correspond respectively to a semiconductive state and a metallic state of the material. Devices utilizing these semi-conductive glasses as the active elements are generally characterized as being "bistable." Contrary to those utilizing crystalline semiconductor materials, such devices have another remarkable property which is characterized by the absence of rectification. In other words, their electrical characteristics are symmetrical with respect to the polarity of applied electric fields. Such devices are, therefore, particularly suitable for use in controlling A.C. electrical load circuits, although they are also readily adaptable for controlling D.C. electrical load circuits.

Materials for bistable devices are disclosed in U.S. Pats. Nos. 3,177,013; 3,241,009; and 3,271,591. These devices generally undergo rapid transitions between their two physical states when the electrical control signal (voltage or current) applied to the device reaches a critical value. These devices are suitable for use in switching and memory elements. The materials described in the former two references have a negative resistance effect when they are in the semiconductive state, but are not always suitable for use in negative resistance devices such as oscillators and amplifiers, because they are apt to change from the semiconductive state to a metallic state.

The electronic industry has long had a need for non-rectifying monostable negative resistance devices which include glassy materials. By the term "monostable" is meant a device having an I-V characteristic which is single-valued in either the current or the voltage. In other words, its electrical property can be completely expressed by a single continuous curve on a current-voltage plot. Such devices are suitable for use as negative resistance devices such as oscillators and amplifiers, not only for D.C., but also for A.C. circuits.

Most of the semiconductive glasses which are known to be useful for active devices such as mentioned above belong to the category of so-called "chalocogenide glass." Since chalocogenide glasses and their raw materials are, in general, highly poisonous and are rather unstable in an oxidizing atmosphere, especially at high temperature, the manufacturing process for devices utilizing these materials is very complicated. Because of this, it would be highly desirable to be able to make stable devices utilizing oxide glasses.

An object of the present invention is to provide a non-rectifying negative resistance device which is characterized by a monostable current-voltage characteristic.

Another object of the present invention is to provide a non-rectifying monostable negative resistance device including an oxide glass layer.

These objects are achieved by providing a non-rectifying monostable negative resistance device according to this invention which comprises a glass layer having a composition consisting essentially of, by analysis, tellurium, iron, and oxygen, and two electrodes which are applied to opposite surfaces of said glass layer. Such a device has a monostable current-voltage characteristic which includes negative resistance regions, and it does not undergo transformation into a metallic state.

Figure 2:
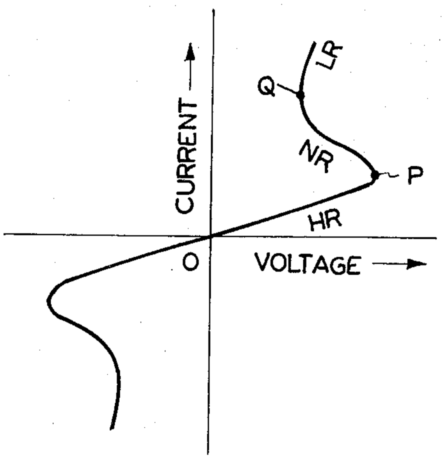

Other and further objects of this invention will be apparent from the following detailed description taken together with the accompanying drawings, wherein:

FIG. 1 is a cross-sectional view of a negative resistance device according to the invention; and FIG. 2 is a plot of current vs. voltage showing the electrical behavior of a device according to the invention.

Before proceeding with the detailed description of this invention, the construction of a non-rectifying monostable negative resistance device contemplated by this invention will be described with reference to FIG. 1. A thin glass layer 1 has two electrodes 2 and 3 applied to the opposite surfaces thereof. Two electrical leads 4 and 5 are connected conductively to the respective electrodes 2 and 3 by any suitable and available method, for example, soldering or welding, or using an electrically conductive adhesive paste. In FIG. 1, the two electrical leads 4 and 5 are connected to the two electrodes 2 and 3, respectively, by using solder 6 and 7. A spring lead made of a suitable metal such as phosphorous bronze can also be used in place of lead 4 or 5 without using solder 6 and 7.

Said glass layer has a composition consisting essentially of, by analysis, tellurium, iron, and oxygen. The atomic ratio of tellurium to iron ranges from 85:15 to 64:36. The atomic ratio of tellurium and iron referred to herein will be defined as a ratio of a number of tellurium atoms to that of iron atoms.

It is preferable that said electrodes 2 and 3 consist of a metal selected from the group consisting of titanium, nickel, iron zirconium and carbon. Optimum results can be obtained when at least one of electrodes 2 and 3 consists essentially of titanium.

In general, the starting materials employed to produce glasses of this invention are high purity chemical reagents, tellurium dioxide and iron oxide in any of the form ferrous oxide, ferroso-ferric oxide and ferric oxide. A mixture of tellurium dioxide and iron oxide in a given atom ratio is placed into a high purity alumina crucible. The mixture in the crucible is melted in open air at an elevated temperature of from 650° to 1,000° C to form glass. After being fired, the glass is cooled to room temperature. In some cases, the molten glass is poured into cold water for cooling it rapidly.

The glass layer 1 of the device can be formed by any suitable and available method. For example, the glass in the form of a block from the crucible is ground and polished into a glass plate. Another method for preparing the glass layer is to use a painting ink having finely divided glass powder dispersed in an organic vehicle in accordance with a glazing technique well known in the art.

Said electrodes 2 and 3 are applied to the plate by any suitable and available methods, such as vacuum deposition of a metal or painting of a conductive paste. In the glazing technique, a metal substrate having the painting ink applied to one surface thereof acts as one of electrodes 2 and 3; another electrode is prepared similarly to the electrodes applied to the plate.

Glasses containing tellurium in an atomic ratio to iron more than 85:15 have a tendency to transform from the semiconductive state to the metallic state, or vice versa; that is, they tend to be bistable. These glasses are not suitable for use as negative resistance elements. On the other hand, compositions containing tellurium in an atomic ratio to iron of less than 64:36 do not readily form homogeneous glasses, even when rapidly cooled. Glasses with these compositions have crystalline inclusions which can be detected by means of a conventional microscopic and/or X-ray analysis. These compositions form monostable devices, but do not have negative resistance effects. Glasses having compositions according to the invention can be used to make devices having both monostable characteristics and negative resistance effects.

The thickness of the glass layer 1 in the device has a significant effect on the resultant properties. In general, devices with glass layers less than 0.002 mm thick have a tendency to exhibit bistable characteristics. The upper limit of the operable thickness is not so critical as the lower limit, but in general it is difficult to electrically activate glass layers more than 0.2 mm thick, as described in detail hereinafter.

A glass layer having a composition according to the invention can be used to produce a device having both a monostable characteristic and a negative resistance effect when provided, on the opposite surfaces, with two electrodes. A preferred electrode is a metal selected from the group consisting of titanium, nickel, iron, zirconium and carbon. The electrode is chemically inactive with respect to the glasses of this invention and ensures the monostable characteristics of the resultant devices. The electrode has a remarkable effect when the glass layer is less than 0.005 mm thick. Chemical activity of electrode materials may be examined by various methods. One testing method is to dip an electrode material into a molten glass at about 800° C, and subsequently examine it for possible chemical changes in the glass and the electrode material by means of conventional microscopic observation, X-ray and chemical analysis. Among various electrode materials, titanium forms the best electrode. One reasons for this is that titanium is very inactive with respect to the glasses of this invention. Another reason is that a titanium electrode is highly adhesive to the glass layers.

It has been discovered according to the invention that it is preferred to subject a glass layer having a resistance higher than $10^6$ ohms to "electrical activation" similar to a process well-known as "forming" in transistor technology. Difficulty in obtaining a stable negative resistance effect can be removed by carrying out "electrical activation."

An illustrative example of an electrical activation process comprises applying a voltage pulse having an amplitude of 50 to 300 volts across a series connection of a device according to the invention and a load resistance of, for example, 50,000 ohms, which restricts flow of excess current. The electrical resistance (at V=0) of a device according to the invention is materially reduced by electrical activation. In general, the thicker glass layers require larger activation voltages. Devices having glass layers thicker than 0.2 mm generally require activation voltages of more than 1,000 volts.

The electrical characteristics of the devices according to the present invention are measured in the following way. A series connection of the device and a resistor of 1,000 to 100,000 ohms is supplied with an A.C. voltage from a 60 cycle A.C. voltage source. The current-voltage characteristic of the device can be observed directly on an oscilloscope.

A plot of the current-voltage characteristic of a device according to the invention is represented in FIG. 2. As is seen, the characteristic is non-rectifying and monostable and consists of three distinct regions separated by two critical points P and Q; a high resistance region HR characterized by positive and relatively large differential resistance, a negative resistance region NR characterized by an increase in the current with decreasing voltage, and a low resistance region LR characterized by positive and relatively small differential resistance. The device has this characteristic which is stable and never transforms into a metallic state. It has many applications similar to those of negative resistance elements which are well-known in the art. For example, a two-terminal oscillator can be constructed by using a device according to this invention, a resistor and a capacitance. Sawtooth oscillations up to 250 kc can be obtained with this oscillator. The oscillations are stable for a period of more than 100 hours, without any detectable changes.

The following examples are directed to specific constructions of the device according to the invention having the desired electrical properties. The electrical characteristics of the devices of the examples are tabulated in Table 1.

EXAMPLE 1

A glass having an atomic ratio of tellurium to iron of 67:33 was prepared by melting a mixture of 32 g of $TeO_2$ and 8 g of $Fe_2O_3$ at 950° C in air for 1 hour, and air-quenching to room temperature. The glass was crushed and ground to finely divided powder with an average particle size of about 15 microns. A painting ink was prepared by dispersing 1.0 g of the glass powder into 1.0 cc of an organic vehicle consisting of 30 percent ethyl-cellulose and 70 percent carbitol-acetate. A titanium plate having an area of 5 × 5 $mm^2$ and a thickness of 0.5 mm was used as one of the electrodes. The titanium plate was chemically etched with an etching solution consisting of 1 part of 47 percent hydrofluoric acid, 4 parts of concentrated nitric acid and 5 parts of water. The plate was then rinsed with distilled water and dried. The painting ink described above was applied to one surface of the titanium plate in an area of about 2×2 $mm^2$ by using a conventional technique of screen painting. After being dried at about 150° C in air about 30 minutes, the plate with painting ink was heated slowly in air at a rate of about 5° C/min., from room temperature up to 510° C. At the first stage of this heating procedure, organic constituents of the ink decomposed and evaporated, and only the glass powder remained on the surface of the titanium plate. Finally, the glass became molten, and a glass layer was formed with a uniform thickness of about 0.03 mm. A counter electrode circular in shape and having a diameter of about 0.6 mm was prepared by painting a graphite-dispersed conducting paste on the glass layer. A copper lead having a diameter of 0.3 mm was welded to an edge of the titanium plate. A spring lead made of phosphorous bronze was attached conductively to the counter electrode by spring action.

EXAMPLE 2

A device was constructed by the same method as Example 1, but the counter electrode of this example was a vacuum deposited titanium film.

EXAMPLE 3

A device was constructed by the same method as Example 1, but the counter electrode of this example was a vacuum deposited carbon film.

EXAMPLE 4

A device was constructed by the same method as Example 1, but the counter electrode of this example was a vacuum deposited iron film.

EXAMPLE 5

A glass similar to that of Example 1 having an atomic ratio of tellurium to iron of 79:21 was prepared by melting a mixture of 35.4 g of $TeO_2$ and 4.6 g of $Fe_3O_4$ at 900° C in air for 30 minutes, and air-quenching to room temperature. A painting ink similar to that of Example 1 was prepared by using 2.0 g of the powdered glass and 1.0 cc of the same organic vehicle as in Example 1. The base electrode of this example was a zirconium plate having the same dimension as the titanium plate used in Example 1. A device was constructed by the same method as in Example 1. The thickness of the glass layer was about 0.05 mm. The device as constructed was electrically activated by using a protecting resistor of 100,000 ohms and a voltage pulse with an amplitude of 180 volts and a width of 100 micro-seconds.

EXAMPLE 6

A glass similar to that of Example 1 having an atomic ratio of tellurium to iron of 85:15 was prepared by melting a mixture of 23 g of $TeO_2$ and 2 g of $Fe_2O_3$ at 850° C in air for 1 hour, and air-quenching to room temperature. A painting ink similar to that of Example 1 was prepared by using 0.1 g of the powdered glass and 1.0 cc of the organic vehicle. The base electrode of this example was a thin titanium film of about 1 micron in thickness formed on a refractory glass plate by a method of vacuum deposition. A glass layer was formed on the titanium film by the same method as Example 1, but the glazing temperature of the example was 560° C. At this temperature, viscosity of the glass is so small that it is spread over other parts of the titanium film where the ink was not printed previously. As a consequence, a thin glass layer was formed with a mean thickness of about 0.002 mm. A counter electrode having a diameter of about 0.6 mm was prepared by vacuum deposition of titanium. Two electrical leads were connected by the same method as in Example 1.

EXAMPLE 7

A device was constructed by the same method as Example 6, but the counter electrode of this example was a vacuum deposited nickel film.

EXAMPLE 8

A glass having an atomic ratio of tellurium to iron of 64:36 was prepared by melting a mixture of 39 g of $TeO_2$ and 11 g of $Fe_2O_3$ at 1,000° C for 30 minutes, and air-quenching to room temperature. A glass plate with an area of about 0.36 $cm^2$ and a thickness of about 0.2 mm was prepared by grinding down a piece of the glass with an alumina abrasive powder. Two electrodes having diameters of about 0.6 mm were applied by vacuum deposition of titanium to opposite surfaces of said glass plate. Two electrical leads were connected to the electrodes by using an adhesive paste having silver dispersed therein. The device as constructed was electrically activated by using a protecting resistor of 2,000,000 ohms and 60 cycle sine-wave voltage with peak voltage of about 1,000 volts.

While the invention has been described in detail in the foregoing specification, the aforesaid is by way of illustration only and is not restrictive in character.

TABLE 1

| Example | Resistance (kilo-ohm) | Current-Voltage Characteristics at P and Q $V_Q$ (volt) | $I_P$ (ma) | $V_Q$ (volt) | $I_Q$ (ma) |
|---|---|---|---|---|---|
| 1 | 41 | 14 | 0.6 | 6.8 | 1.2 |
| 2 | 38 | 12 | 0.5 | 8.7 | 1.0 |
| 3 | 65 | 17 | 0.3 | 8.0 | 0.7 |
| 4 | 63 | 18 | 0.6 | 12 | 1.1 |
| 5 | 80 | 26 | 0.5 | 16 | 1.2 |
| 6 | 18 | 6.5 | 1.5 | 2.0 | 4.2 |
| 7 | 20 | 8.0 | 2.0 | 2.8 | 5.2 |
| 8 | 8.2 | 6.3 | 1.0 | 5.5 | 3.2 |

Differential resistance at V=0

What is claimed is:

1. A non-rectifying monostable negative resistance device comprising a glass layer having a composition consisting essentially of, by analysis, tellurium, iron, and oxygen, and two electrodes applied to opposite surfaces of said glass layer.

2. A negative resistance device as claimed in claim 1 wherein the atomic ratio of said tellurium to said iron ranges from 85:15 to 64:36.

3. A negative resistance device as claimed in claim 1 wherein said glass layer is not less than 0.002 mm in thickness.

4. A negative resistance device as claimed in claim 1 wherein said glass layer is not more than 0.2 mm in thickness.

5. A negative resistance device as claimed in claim 1 wherein each of said electrodes consists essentially of one metal selected from the group consisting of titanium, nickel, iron, zirconium, and carbon.

6. A negative resistance device as claimed in claim 1 wherein at least one of said electrodes consists essentially of titanium.

* * * * *